US006342314B1

(12) United States Patent
Sieminski et al.

(10) Patent No.: US 6,342,314 B1
(45) Date of Patent: Jan. 29, 2002

(54) GEOMETRY CHANGE DIFFUSION TUBE FOR METAL-AIR BATTERIES

(75) Inventors: Dennis Paul Sieminski; Leonard J. Hope, both of Atlanta, GA (US)

(73) Assignee: AER Energy Resources, Inc., Smyrna, GA (US)

( * ) Notice: Subject to any disclaimer, the term of this patent is extended or adjusted under 35 U.S.C. 154(b) by 0 days.

(21) Appl. No.: 09/216,273

(22) Filed: Dec. 18, 1998

(51) Int. Cl.[7] .......................... H01M 8/02; H01M 12/06
(52) U.S. Cl. ............................ 429/13; 429/22; 429/27; 429/34; 429/82
(58) Field of Search .......................... 429/13, 22, 27, 429/34, 82, 83

(56) References Cited

U.S. PATENT DOCUMENTS

| 2,639,190 A | 5/1953 | Sitzer |
| 3,537,903 A | 11/1970 | Braun |
| 3,613,732 A | 10/1971 | Willson et al. |
| 3,629,009 A | * 12/1971 | Benett |
| 4,177,327 A | 12/1979 | Mathews et al. ............ 429/27 |
| 4,180,624 A | 12/1979 | Winsel ........................ 429/54 |
| 4,262,062 A | 4/1981 | Zatsky |
| 4,405,387 A | 9/1983 | Albrecht et al. |
| 4,484,691 A | 11/1984 | Lees ......................... 429/56 X |
| 4,855,195 A | 8/1989 | Georgopoulos et al. ...... 429/54 |
| 4,913,983 A | 4/1990 | Cheiky |
| 4,950,561 A | * 8/1990 | Niksa et al. ................. 429/27 |
| 5,183,222 A | 2/1993 | Ramsey, Jr. ............... 429/27 X |
| 5,211,371 A | 5/1993 | Coffee ........................ 251/11 |
| 5,258,239 A | 11/1993 | Kobayashi .................. 429/27 |
| 5,304,431 A | 4/1994 | Brooke |
| 5,325,880 A | 7/1994 | Johnson et al. .............. 137/1 |
| 5,567,284 A | * 10/1996 | Bauer et al. .............. 429/27 X |
| 5,619,177 A | 4/1997 | Johnson et al. ............. 337/140 |
| 5,622,482 A | 4/1997 | Lee ........................... 417/321 |
| 5,639,568 A | 6/1997 | Pedicini et al. ............. 429/27 |
| 5,650,241 A | * 7/1997 | McGee ..................... 429/82 X |
| 5,691,074 A | 11/1997 | Pedicini ..................... 429/27 |
| 5,747,187 A | 5/1998 | Byon ......................... 429/58 |
| 5,758,823 A | 6/1998 | Glezer et al. ................. 239/4 |
| 5,888,664 A | * 3/1999 | Sieminski et al. ........... 429/27 |

FOREIGN PATENT DOCUMENTS

| FR | 2 148 276 | 3/1973 |
| JP | Sho 50 40773 | 12/1975 |
| WO | WO 00/36694 | 6/2000 |

OTHER PUBLICATIONS

"Actuator Wire, A Solid State Actuator That Moves By 'Molecular Restructuring'!," Dynalloy, Inc., Irvine, California, 2 pages, undated. (Date unknown).

"Part Two, Using Shape Memory Wires," Mondo-tronics, Inc., Roger G. Gilbertson, 13 pages, undated. (Date unknown).

"Overview of Microelectromechanical Systems, Microactuation Methods (those more commonly in use)," Mehran Mehregany, Case Western Reserve University, Cleveland, Ohio, Copyright 1992. (Month unknown).

* cited by examiner

Primary Examiner—Stephen Kalafut
(74) Attorney, Agent, or Firm—Alston & Bird LLP

(57) ABSTRACT

A ventilation system for metal-air battery cells having collapsible isolation passageways for controlling ambient airflow to the oxygen electrode of the metal-air battery. The ventilation system has at least one inlet isolation passageway and at least one outlet isolation passageway. The isolation passageways normally remain in a collapsed position to restrict airflow when an air mover is turned off. The isolation passageways may be configured into an expanded position in response to airflow generated by the air mover. In the expanded position, the inlet isolation passageway permits ambient air to flow across the oxygen electrode and the outlet isolation passageway permits oxygen depleted air to be expelled.

56 Claims, 3 Drawing Sheets

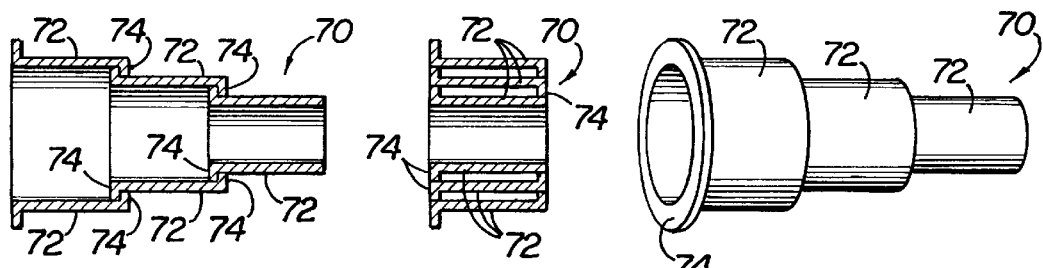
FIG. 11  FIG. 12  FIG. 13
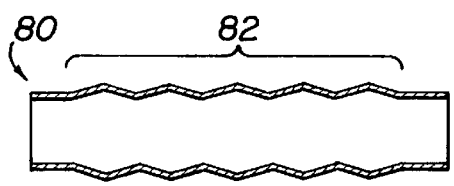 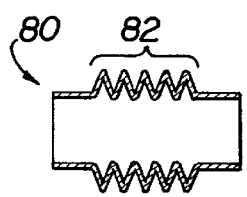
FIG. 14  FIG. 15
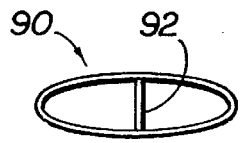 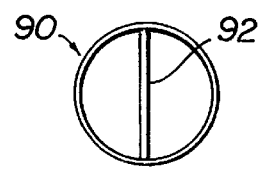
FIG. 16  FIG. 17
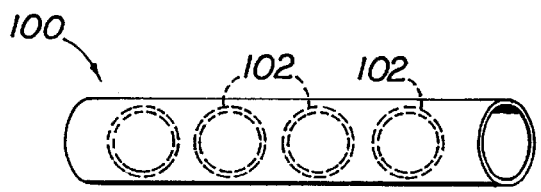
FIG. 19
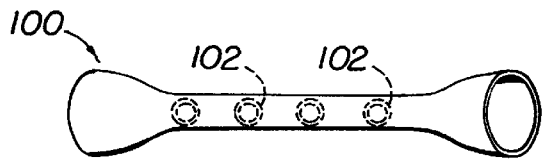
FIG. 18

GEOMETRY CHANGE DIFFUSION TUBE FOR METAL-AIR BATTERIES

RELATED APPLICATIONS

The following patent applications for related subject matter, "CYLINDRICAL METAL-AIR BATTERY WITH A CYLINDRICAL PERIPHERAL AIR CATHODE" application Ser. No. 215,820 now U.S. Pat. No. 6,274,261; "AIR MANAGER SYSTEMS FOR METAL-AIR BATTERIES UTILIZING A DIAPHRAGM OR BELLOWS" application Ser. No. 216,026; "AIR MOVER FOR A METAL-AIR BATTERY UTILIZING A VARIABLE VOLUME ENCLOSURE" application Ser. No. 216,118; "DIFFUSION CONTROLLED AIR VENT WITH AN INTERIOR FAN" application Ser. No. 215,879; "UNIFORM SHELL FOR A METAL-AIR BATTERY" application Ser. No. 09/216,114 now U.S. Pat. No. 6,235,418; "LOAD RESPONSIVE AIR DOOR FOR A METAL-AIR CELL" application Ser. No. 09/216,115; "AIR-MANAGING SYSTEM FOR METAL-AIR BATTERY USING RESEALABLE SEPTUM" application Ser. No. 216,343 now U.S. Pat. No. 6,168,577; and "AIR DELIVERY SYSTEM WITH VOLUME-CHANGEABLE PLENUM OF METAL-AIR BATTERY" application Ser. No. 216,660, all of which are incorporated herein by reference, have been filed concurrently with the present application by the assignee of the present application.

FIELD OF THE INVENTION

The present invention relates to metal-air power supplies. This invention more particularly pertains to ventilation systems for controlling ambient airflow to the oxygen electrodes of metal-air batteries.

BACKGROUND OF THE INVENTION

Metal-air cells have been recognized as a desirable means for powering portable electronic equipment, such as personal computers, camcorders and telephones, because such battery cells have a relatively high power output with relatively low weight as compared to other types of electrochemical battery cells. Metal-air batteries include an air permeable cathode, commonly referred to as an oxygen electrode, and a metallic anode separated by an aqueous electrolyte. Electrical energy is created with a metal-air battery by an electrochemical reaction.

Metal-air battery cells utilize oxygen from the ambient air as a reactant in the electrochemical process. During discharge of a metal-air battery, such as a zinc-air battery, oxygen from the ambient air is converted at the oxygen electrode to hydroxide, zinc is oxidized at the anode by the hydroxide, and water and electrons are released to provide electrical energy. Metal-air cells utilize oxygen from the ambient air as a reactant, rather than utilizing a heavier material, such as a metal or metallic composition. To operate a metal-air battery, it is therefore necessary to provide a supply of oxygen to the oxygen electrode of the battery.

It is desirable to preserve the efficiency, power and lifetime of a metal-air cell by effectively limiting the transpiration of water vapor between the electrolyte and the atmosphere. Multiple metal-air batteries can be stacked in a common housing to form a battery pack and to isolate the oxygen electrodes. An air mover is used to provide an airflow of ambient air in to the housing of the battery pack to support higher power output. When the air mover is turned on, the air mover circulates ambient air across the oxygen electrodes and forces air through inlet and outlet passageways to refresh the circulating oxygen-depleted air with ambient air, so that oxygen is supplied to the oxygen electrodes. The power output of the battery pack is increased as a result of the flow of ambient air across the metal-air batteries. When the air mover is turned off, airflow across the metal-air batteries is reduced. The reduced airflow amounts to reduced power output.

However, a nominal amount of airflow is still required to maintain an open cell voltage in the battery cells even though power output is no longer desired. During periods of non-use, such as when the battery pack is being stored, the battery pack tends to maintain an equilibrium relative humidity. Thus, if the ambient humidity is greater than the equilibrium humidity within the battery housing, the battery pack will absorb water from the air through the oxygen electrode and fail due to a condition called flooding. On the other hand, if the ambient humidity is less than the equilibrium humidity within the battery housing, the metal-air batteries will release water vapor from the electrolyte through the oxygen electrode and fail due to drying out. Therefore, when the battery pack is not in use, the cells may fail when the level of ambient air humidity differs from the humidity level within the battery housing.

What is needed is a ventilation system for metal-air batteries that keeps water loss or gain to a minimum while also allowing sufficient ambient airflow during discharge so that enough oxygen is present to fuel the electrochemical reaction. For example, U.S. Pat. No. 5,691,074 to Pedicini, entitled "DIFFUSION CONTROLLED AIR VENT FOR A METAL-AIR BATTERY", the entire disclosure of which is incorporated herein by reference, discloses a ventilation system for metal-air batteries. In Pedicini, except for the inlet and outlet passageways, the oxygen electrodes of one or more metal-air battery cells are isolated from the ambient air while the battery cells are not operating. The isolation passageways are sized to (i) pass sufficient ambient airflow while the air mover is operating to enable the metal-air battery cells to provide an output current for powering a load, but (ii) restrict ambient airflow to a low level of diffusion of air while the isolation passageways are unsealed and no ambient air is forced therethrough.

When the air mover is off and the humidity level within the cell is relatively constant, only a very limited amount of air diffuses through the passageways. The water vapor within the cell protects the oxygen electrodes from exposure to oxygen. The oxygen electrodes are sufficiently isolated from the ambient air by the water vapor such that the cells have a long "shelf life" without sealing the passageways. These isolation passageways may be referred to as "diffusion tubes", "isolating passageways", or "diffusion limiting passageways" due to their isolation capabilities. Other exemplary isolation passageways and systems are disclosed in U.S. Pat. No. 5,919,582, the entire disclosure of which is incorporated herein by reference.

In accordance with the above-referenced example from Pedicini, the isolation passageways function to limit the amount of oxygen that can reach the oxygen electrodes, which minimizes the self discharge and leakage or drain current of the metal-air battery cells. Self discharge can be characterized as a chemical reaction within a metal-air battery cell that does not provide a usable electric current, but diminishes the capacity of the metal-air battery cell for providing a usable electric current. Self discharge occurs, for example, when a metal-air cell dries out and the zinc anode is oxidized by the oxygen that seeps into the cell during periods of non-use. Leakage current, which is synonymous with drain current, can be characterized as the electric current that can be provided to a closed circuit by a metal-air cell while the cell is connected to the circuit and air is not provided to the cell by an air mover. The isolation passageways as described above may limit the drain current to an amount smaller than the output current by a factor of at least about 50.

The isolation passageways of the Pedicini patent also minimize the detrimental impact of humidity on the metal-air cells, especially while the air mover is not forcing airflow through the isolation passageways. The isolation passageways limit the transfer of moisture into or out of the metal-air cells while the air mover is off, so that the negative impacts of the ambient humidity level are minimized.

The efficiency of the isolation passageways in terms of the transfer of air and water into and out of a metal-air cell can be described in terms of an "isolation ratio." The "isolation ratio" is the ratio of the rate of water loss or gain by a cell while its oxygen electrodes are fully exposed to the ambient air, as compared to the rate of the water loss or gain of the cell while its oxygen electrodes are isolated from the ambient air, except through one or more limited openings. For example, given identical metal-air cells having electrolyte solutions of approximately thirty-five percent (35%) KOH in water, an internal relative humidity of approximately fifty percent (50%), the ambient air having a relative humidity of approximately ten percent (10%), and no fan-forced circulation, the water loss from a cell having an oxygen electrode fully exposed to the ambient air should be more than 100 times greater than the water loss from a cell having an oxygen electrode that is isolated from the ambient air, except through one or more isolation passageways of the type described above. In this example, an isolation ratio of more than 100 to 1 should be obtained.

Metal-air cells have found limited commercial use in devices, such as hearing aids, which require a low level of power. In these cells, the air openings which admit air to the oxygen electrode are so small that the cells can operate for some time without flooding or drying out as a result of the typical difference between the outside relative humidity and the water vapor pressure within the cell. However, the power output of such cells is too low to operate devices such as camcorders, cellular phones, or laptop computers. Enlarging the air openings of a typical "button cell" would lead to premature failure as a result of flooding or drying out.

Systems designed to provide the dual functions of providing air to a metal-air cell for power output and isolating the cells during non-use are referred to as air managers. An important component of a successful air manager is an air mover, such as a fan or an air pump. In the past, air movers used in metal-air batteries have been bulky and expensive relative to the volume and cost of the metal-air cells. While a key advantage of metal-air cells is their high energy density resulting from the low weight of the oxygen electrode, this advantage is compromised by the space and weight required by an effective air mover. Space that could otherwise be used for battery chemistry to prolong the life of the battery must be used to accommodate an air mover. This loss of space can be critical to attempts to provide a practical metal-air cell in small enclosures such as the "AA" cylindrical size now used as a standard in many electronic devices. Also, the air mover uses up energy stored in the cells.

One factor increasing the required output characteristics of an air mover for a metal-air cell is the need to overcome the flow resistance of isolating passages of the type described above while maintaining the necessary isolation ratio. To allow smaller power air movers, there is a need for an air manager that permits greater ambient airflow to support higher power output while the metal-air battery cells are in use without making the air mover larger, more expensive to acquire or operate, or require more energy to operate. This new air manager should also restrict the ambient airflow to the extent necessary to protect the cells against excess humidity exchange when the metal-air battery cells are no longer is use.

BRIEF SUMMARY OF THE INVENTION

The present invention alleviates or solves the above-described problems in the prior art by providing an improved ventilation system for metal-air battery cells. The present method and apparatus seeks to provide an efficient method of isolating the oxygen electrodes of metal-air batteries from ambient air when the metal-air battery cells are not in use, while satisfying the need for maximizing ambient airflow to the oxygen electrodes to support higher power output when required, with a low cost, efficient, small air mover.

In accordance with the present invention, this object is accomplished by providing a ventilation system having one or more ventilation passageways. At least a portion of each ventilation passageway is a collapsible isolation passageway for controlling the amount of ambient airflow into a battery housing or a metal-air battery cell. When power is desired, an air mover is turned on to generate ambient airflow into and across the oxygen electrodes. In response to the air mover being turned on, the geometry of the isolation passageways is altered to permit a maximum ambient airflow. When the air mover is turned off, the geometry of the isolation passageways is altered to restrict ambient airflow to substantially isolate the metal-air battery cells when not in use.

Each isolation passageway provides an isolation function while at least partially defining an open communication path between the ambient air and the oxygen electrodes. In some embodiments, however, the isolation passageway embodies the entire ventilation passageway. The isolation passageways regulate the transfer of air and water into and out of the metal-air cell. The transfer of air and water to a fully exposed cell is at least about 50 times greater or more than when the cell is isolated from the ambient air.

In an exemplary embodiment of the present invention, the isolation passageways are biased to normally remain in at least a partially collapsed position to restrict ambient airflow through the battery housing. However, the isolation passageways are expandable in response to the air mover being turned on and ambient airflow passing through the battery housing. When the isolation passageways are in the collapsed position, the isolation passageways have a length in the direction of airflow through the respective isolation passageways that is greater than a width perpendicular to the direction of airflow through the respective isolation passageways. When the air mover is turned on and the isolation passageways are altered, the cross-sectional area or width perpendicular to the direction of the airflow therethrough is enlarged to permit greater ambient airflow into the battery housing and, therefore, greater power output.

Ventilation systems for metal-air cells having isolation passageways formed in accordance with the present invention have a number of advantages. An important advantage of the novel ventilation system is the ability to vary the size of the isolation passageway in response to the operation of the air mover.

Accordingly, an object of this invention is to provide an improved ventilation system for metal-air batteries that overcomes the aforementioned inadequacies of prior art ventilation systems.

Another object of the present invention is to provide a ventilation system for metal-air batteries that permits sufficient airflow during discharge of the metal-air batteries to optimize power output.

Still another object of the present invention is to provide a ventilation system for metal-air batteries that restricts ambient airflow in order to minimize exposure of the metal-air batteries to the atmosphere when the metal-air batteries are not in use.

Yet another object of the present invention is to provide a structurally simple and economical ventilation system for metal-air batteries.

Still a further object of the present invention is to provide a ventilation system for metal-air batteries wherein the operation of the metal-air batteries is transparent to the user. That is, in order to operate the ventilation system of the present invention, no action on part of the user is required.

Yet a further object of the present invention is to achieve and maintain a high isolation ratio.

Another object of the present invention is to minimize the power required to move sufficient air through the isolation passageways.

The foregoing has broadly outlined some of the more significant objects and features of the present invention. These should be construed to be merely illustrative of some of the more prominent features and applications of the intended invention. Many other beneficial results can be obtained by applying the disclosed invention in a different manner or by modifying the disclosed embodiments. Accordingly, other objects and a more comprehensive understanding of the invention may be obtained by referring to the detailed description of the preferred embodiment taken in conjunction with the accompanying drawings, in addition to the scope of the invention defined by the claims. For a more succinct understanding of the nature and objects of the present invention, reference should be directed to the following detailed description taken in connection with the accompanying drawings.

BRIEF DESCRIPTION OF THE DRAWINGS

FIG. 8 also illustrates the air mover outside of the battery housing.

FIG. 11 is a cross-sectional view of an alternative embodiment of an isolation passageway of the present invention in a longitudinally extended position for restricting ambient airflow to the oxygen electrodes.

FIG. 12 is a cross-sectional view of the passageway illustrated in FIG. 11 in a longitudinally retracted position for permitting airflow to the oxygen electrodes.

FIG. 13 is a perspective view of the isolation passageway illustrated in FIG. 11.

FIG. 14 is a cross-sectional view of an alternative embodiment of an isolation passageway of the present invention in the longitudinally extended position for restricting airflow to the oxygen electrodes.

FIG. 15 is a cross-sectional view of the passageway illustrated in FIG. 14 collapsed into the longitudinally retracted position for permitting ambient airflow to the oxygen electrodes.

FIG. 16 is a front view of an alternative embodiment of an isolation passageway in the collapsed position.

FIG. 17 is a front view of the passageway shown in FIG. 16 in the expanded position.

FIG. 18 is a perspective view of an alternative embodiment of an isolation passageway of the present invention in the collapsed position.

FIG. 19 is a perspective view of the passageway shown in FIG. 18 in the expanded position.

Similar reference characters refer to similar parts throughout the several views of the drawings.

DETAILED DESCRIPTION OF THE PREFERRED EMBODIMENTS

With reference to the drawings, a new and improved ventilation system for metal-air batteries embodying the principles and concepts of the present invention and generally designated by the reference number 20 will be described.

Figure 1:
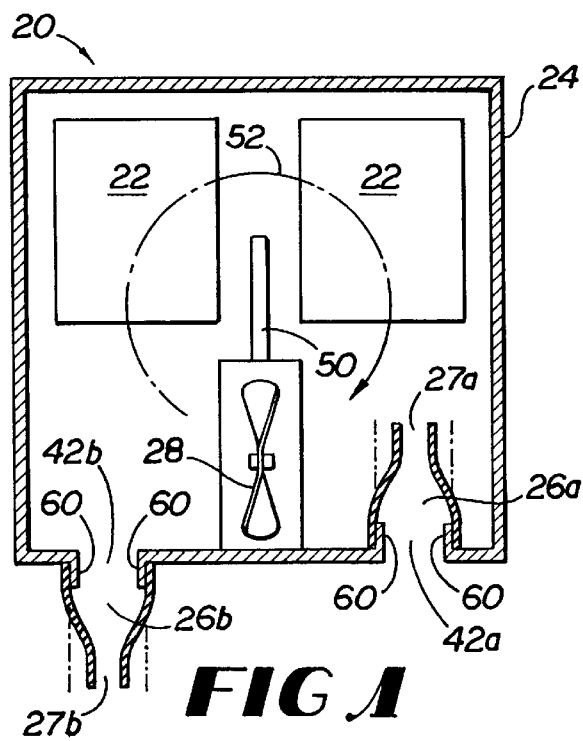
FIG. 1 is a diagrammatic top cross-sectional view of one embodiment of a battery pack having collapsed isolation passageways coupled to the air inlets and outlets of a battery housing.
Figure 2:
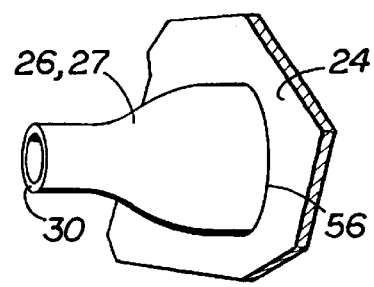
FIG. 2 is a side perspective view of one embodiment of the elongated ventilation passageway of the present invention with an isolation portion in the collapsed position and sized for restricting ambient airflow.
Figure 6A:
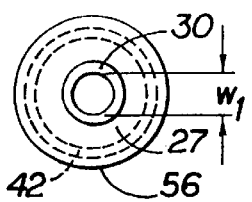
FIG. 6A is a front view of the isolation passageway of FIG. 2 illustrating one embodiment of a distal end of an isolation passageway having a generally circular configuration when the isolation passageway is in the collapsed position.
Figure 6B:
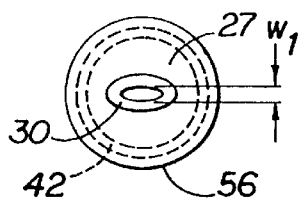
FIG. 6B is a front view of an isolation passageway illustrating an alternative embodiment of the distal end when in the collapsed position.
Figure 7:
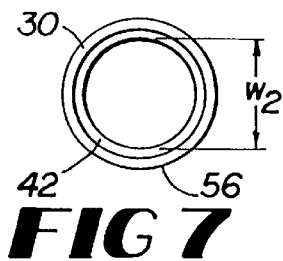
FIG. 7 is a front view of the passageway illustrated in FIG. 3 having a generally circular distal end while in the expanded position.
Figure 8:
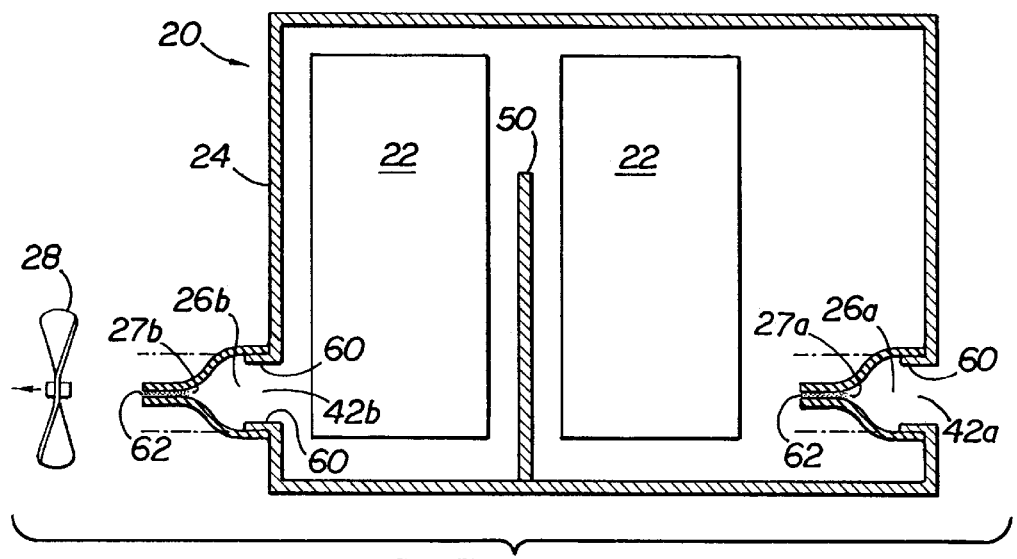
FIG. 8 is a diagrammatic top cross-sectional view of a battery pack illustrating an alternative position for the passageways in the battery housing.
Figures 9, 10:
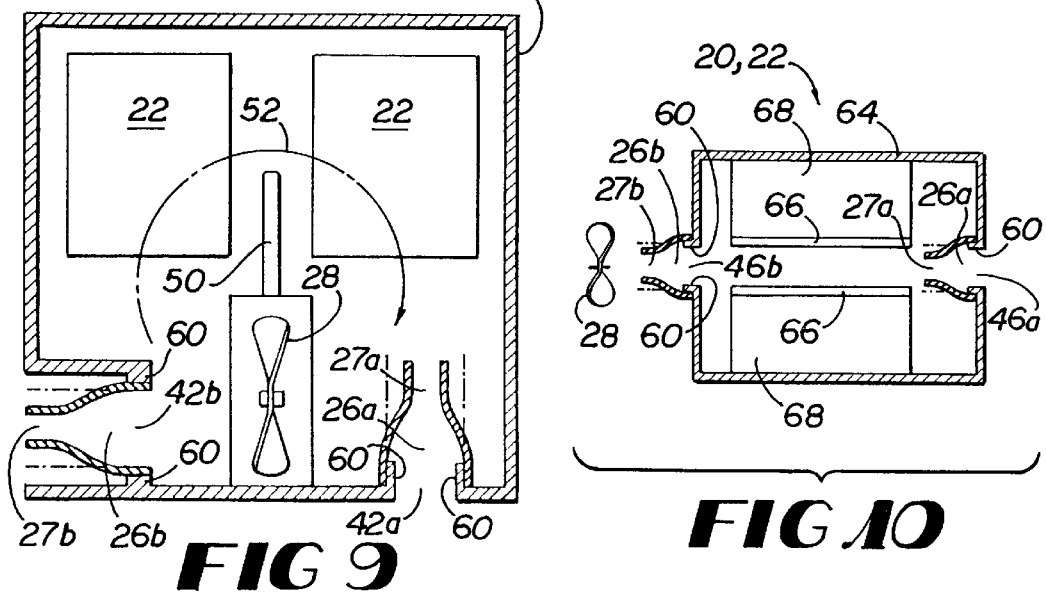
FIG. 9 is a diagrammatic top cross-sectional view of an alternative embodiment of the battery pack having a passageway partially concealed by the battery housing.
FIG. 10 is a diagrammatic top cross-sectional view of an exemplary embodiment of a cylindrical metal-air battery cell.

In accordance with one exemplary embodiment of the present invention, FIG. 1 illustrates an exemplary embodiment of the ventilation system 20 having metal-air battery cells 22 enclosed by a common battery cell housing 24 to form a battery pack. FIG. 1 also illustrates elongated ventilation passageways 26, responsive to an air mover 28, for venting ambient air to the oxygen electrodes (not shown) of the metal-air battery cells 22. FIGS. 2–5 illustrate perspective and cross-sectional views of a ventilation passageway 26. FIGS. 6A, 6B and 7 illustrate end views of distal ends 30 of the ventilation passageways 26. FIGS. 8 and 9 illustrate alternative embodiments for enclosing metal-air cells with the housing 24. FIG. 10 illustrates an exemplary embodiment of a single metal-air cell 40 having ventilation passageways 26 for ventilation. FIGS. 11–19 illustrate four alternative embodiments of ventilation passageways. The features of the present invention depicted in the above-described Figures are described in greater detail below.

The metal-air battery cells 22 are isolated from the ambient air, except that the oxygen electrodes communicate with ambient air through one or more ventilation passageways 26 in response to operation of the air mover 28. At least a portion of the ventilation passageways 26 are composed of thin walled, light weight and resilient materials such as thin wall elastomers, thin wall thermoplastics and thermoplastic elastomers, fabrics and the like. These materials also include polymers having elastic properties of natural rubber such as urethane polymers, vinyl polymers, silicone rubber, and the like. The material can also be a multi-layer system, combining two or more materials, achieved by co-extrusion, co-molding and extrusion coating techniques.

In addition, the material should have some resistance to permeability by water and carbon dioxide. Permeability of these gases can occur through the attachment area of the material to the housing. However, transmission through this attachment area can be insignificant relative to their transmission through the isolation passageways themselves. These materials may be coated with materials that inhibit further water vapor transmission by procedures such as metalizing.

Examples of materials suitable for use in the present invention are identified in the table below along with their respective vapor transmission rates.

| Material | Vapor Transmission Rate (VTR), g mm/m$^2$ day |
| --- | --- |
| Polyvinylidene Chloride (PVDC) | 0.01–0.08 |
| Polychlorotrifluoroethylene | 0.015 |
| Polypropylene (oriented) | 0.16 |
| Polypropylene | 0.26 |
| Polyethylene Terephthalate | 0.8 |
| Nylon 66 | 1.5 |
| Olefinic Thermoplastic Elastomer | 0.16–0.81 |
| Polybutadiene Rubber Film | 17.7 |
| Polyurethane | 0.94–3.43 |
| Silicone | 1.73–3.11 |

At least a portion of the walls of the ventilation passageways of this embodiment forms an isolation passageway 27 which must be of a thickness to permit opening in response to ambient air being forced therethrough. However, the entire length of the ventilation passageway may serve as an isolation passageway. An increase in air pressure within the isolation passageways 27 when the air mover 28 is operating causes the walls of the isolation passageway 27 to expand in cross-sectional area. More specifically, the isolation passageways 27 are variable in response to the operation of the air mover 28. The particular air mover 28 utilized and the rate of airflow needed to operate the cells at a desired level by varying the isolation passageways 27 is related to the geometry of the cathode plenums and ventilation passageways 26 as well as the materials making up the isolation passageways 27 as described above.

The isolation passageways 27 are re-formed by collapsing into at least a partially collapsed position when the ambient air is no longer being forced through. The systems having only partially collapsed isolated passageways 27 are nevertheless also referred to as being in a collapsed position even though the ventilation passageway 26 remains unsealed. In some ventilation systems, these unsealed passageways are also referred to as semi-collapsible. However, in systems utilizing passageways intended to be sealed for restricting airflow, the sealing properties of the passageways may be enhanced by placing an oil or grease coating, or other like sealant, on the inside of the isolation passageway 27. This will in effect fill any unwanted gap which may exist and, thereby, further reduce the diffusion of gas and vapor. Also, the sealed passageway may be utilized to seal out any debris when the battery is not being utilized. For example, a coating of vacuum grease, commonly used in sealing vacuum apparatuses, may be utilized.

Figure 4A:
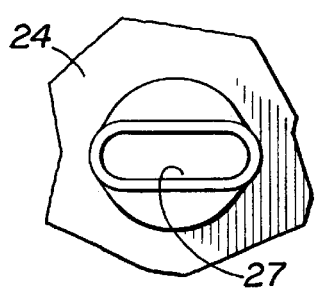
FIGS. 4A and 4B show the isolation passageway of FIG. 2 when in the collapsed position.
Figure 4B:
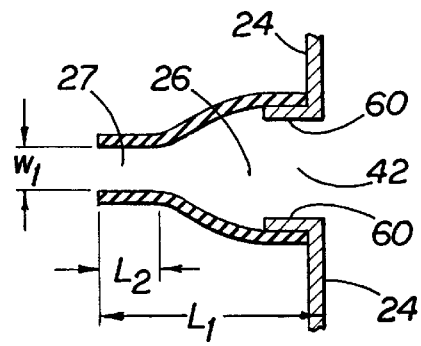
Figure 5A:
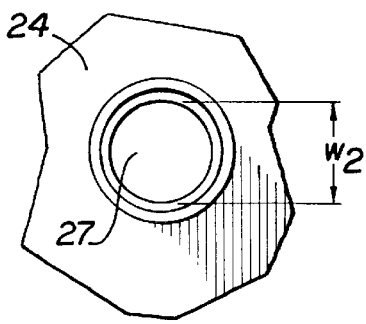
FIGS. 5A and 5B show the passageway of FIG. 3 in the expanded position.
Figure 5B:
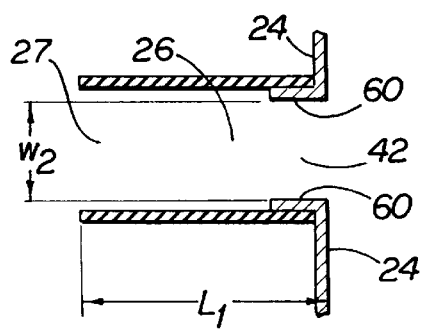

For example, the partially collapsed ventilation passageway 26 illustrated in FIG. 4B has lengths $L_1$, $L_2$ and a width $w_1$. $L_1$ is the length of the entire ventilation passageway 26 and $L_2$ is the isolation passageway 27 of the ventilation passageway 26. Preferably, the width $w_1$ is measured along $L_2$ at the distal end 30 of the passageway 26. The ventilation passageway 26 illustrated in FIG. 5B, having an expanded isolation passageway, is the same length $L_1$ but has a width $w_2$. The widths $w_1$ and $w_2$ are preferably defined at the narrowest point along the length $L_1$ of the passageway 26. For example, in FIG. 4B, the width $w_1$ is limited by only the width of the collapsed isolation passageway 27 along length $L_2$. However, in FIG. 5B, the width $w_2$ is limited and defined by the opening 42 of the expanded passageway 26.

Figure 3:
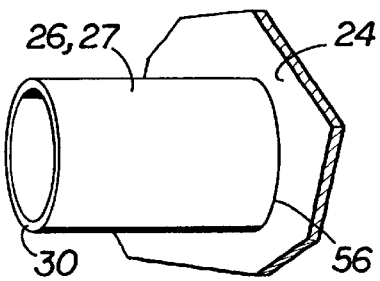
FIG. 3 is a side perspective view of the passageway of FIG. 2 in the expanded position to maximize airflow capacity.

The isolation passageways 27 are biased to remain in the collapsed position to restrict ambient airflow when the air mover 28 is not operating. When the air mover is operating, however, ambient air forced through the ventilation passageways 26 encounters less resistance, thereby permitting enhanced airflow across the oxygen electrodes with less pressure drop across the passageways. FIG. 3 illustrates the ventilation passageway 27 in an expanded position to permit freer ambient airflow to the oxygen electrodes.

For a collapsed isolation passageway, the inflation pressure will be the sum of the atmospheric pressure bearing on the projected area, plus approximately, the force necessary to lift the weight of the passageway material. As an example, if an isolation passageway has a 0.062 inch diameter, a 1 inch length, and weighs 1 gram, the resulting inflation pressure is calculated as follows:

$$0.062" \times 1.0" \times 14.7 \text{ lbs./sq. in} = 0.9 \text{ psi.};$$

plus 1 gram or 0.002 pounds which requires an additional $$0.002 \text{ lbs.}/0.062 \text{ sq. in. or } 0.03 \text{ lbs./sq. in.};$$

resulting in a total inflation pressure of 0.93 psi. Therefore, an isolation passageway 27 made of PVDC requires approximately 0.93 psi. to expand into the expanded position.

As a comparison, the isolation ratio of this exemplary isolation passageway versus a fixed diameter passageway with the same length will be the ratio of area of the collapsed isolation passageway plus the area of the fixed diameter passageway multiplied by the permeability of the material of the collapsed isolation passageway, as compared to the area of the fixed diameter passageway. By selecting a low permeability material, the contribution due to the permeability of the material is negligible compared to that through the area of the collapsed passageway. For example, if the collapsed isolation passageway has a gap G, the area of the collapsed passageway available for diffusion is approximately 0.5 $\pi$dG sq. in. On the other hand, the area of a fixed diameter passageway is approximately $\pi d^2/4$. Therefore, the ratio is 2 G/d. For a 0.062 inch diameter passageway and a gap of 0.005, the ratio is 0.16. Thus, the collapsible tube will lose water at a rate that is 16% of a rigid passageway of the same dimensions. In other words, the rigid passageway would have to be 6.26 (inverse of 0.16) times longer to yield the same diffusion rate.

Although the isolation passageways restrict airflow and diffusion while the air mover is not forcing airflow through the ventilation passageways, it is desirable in some systems to permit a limited amount of diffusion through the isolation passageways while the air mover is not forcing airflow through the isolation passageways. For example, for secondary or rechargeable metal-air cells it is preferred that the isolation passageways allow diffusion of oxygen away from the oxygen electrodes to the ambient environment during recharge. As another example, in some circumstances it is desirable for at least a limited amount of oxygen to diffuse from the ambient air through the isolation passageways to the oxygen electrodes. This diffusion maintains a consistent "open cell voltage" and minimizes any delay that may occur when the metal-air cells transition from a low or no current demand state to a maximum output current.

The isolation passageways are preferably constructed and arranged to allow a sufficient amount of flow through the expanded passageways while the air mover is operating so that a sufficient output current, typically at least 50 mA, and preferably at least 130 mA can be obtained from the metal-air cells. In addition, the isolation passageways are preferably constructed when partially collapsed to limit the airflow and diffusion therethrough such that the leakage or drain current that the metal-air cells are capable of providing while the air mover is not forcing airflow through the isolation passageways smaller than the output current by a factor of at least about 50, or greater, as described above. In addition, the isolation passageways are preferably constructed to provide an "isolation ratio" of more than 50 to 1, as described above.

FIG. 1 illustrates inlet and outlet ventilation passageways 26a and 26b, respectively, in the collapsed position. The expanded position is shown in dashed lines. The inlet ventilation passageway 26a extends inward from an air inlet opening 42a into the housing 24 and communicates with the interior of the housing 24. The outlet ventilation passageway 26b extends outward from an air outlet opening 42b. The outlet ventilation passageway 26b communicates with the environment exterior to the housing. The air mover 28 moves air into the housing through inlet ventilation passageway 26a and moves air out of the housing through outlet ventilation passageway 26b. During operation of the air mover 28, the air inside of the housing circulates about a barrier 50 as shown by the directional arrow generally designated by the reference numeral 52. The barrier 50 aides in directing the ambient air in a uniform manner across the oxygen electrodes.

As shown in FIGS. 2, 3, 4A, 4B, 5A and 5B, the ventilation passageways 26 have proximal ends 56 coupled to the battery housing 24. A group of ventilation passageways can be utilized in the aggregate such that the ventilation passageways function in unison as inlets and a second group of ventilation passageways can be utilized in the aggregate such that the second group of ventilation passageways function in unison as outlets. Each opening 42 is defined by a peripheral lip 60 sized for receiving and retaining the proximal end of the ventilation passageway 26. It is preferable that the lip 60 is generally circular and configured to form the proximal end 56 of each isolation passageway to match its opposing distal end 30 in size and shape when the isolation passageway is fully expanded in response to the air mover 28 being turned on.

The isolation passageway portion of the ventilation passageway preferably has a cross-sectional area that is generally perpendicular to the direction of flow therethrough, and a length that is generally parallel to the direction of flow therethrough. The length and the cross-sectional area of the isolation passageway are selected to substantially eliminate airflow and diffusion through the isolation passageways while the air mover is not forcing airflow through the isolation passageways.

The ventilation passageways form only a portion of the path the air must take between the ambient environment and the oxygen electrodes. The ventilation passageways preferably are in the form of tubes as described above. In either case, the isolation portion of the ventilation passageways may be cylindrical, and for some applications each can have a length of about 0.3 to 2.5 inches or longer, with 0.88 to 1.0 inches preferred, and an inside diameter of about 0.03 to 0.3 inches, with about 0.09 to 0.19 inches preferred. The total open area of each isolation passageway for such applications, measured perpendicular to the direction of flow therethrough, is therefore about 0.0007 to 0.5 square inches. In other applications, such as small cylindrical cells, the isolation passageways each can have a length of about 0.1 to 0.3 inches or longer, with about 0.1 to 0.2 inches preferred, and an inside diameter of about 0.01 to 0.05 inches, with about 0.015 preferred. The preferred dimensions for a particular application will be related to the geometry of the isolation passageways and the cathode plenums, the particular air mover utilized, and the volume of air needed to operate the cells at a desired level.

Also, the ventilation passageways are not necessarily cylindrical, as any cross-sectional shape that provides the desired isolation in the isolation portion is suitable. The ventilation passageways need not be uniform along their length, so long as at least a portion, the isolation passageway, is operative to provided the desired isolation. Further, the ventilation passageways may be straight or curved along their length. For example, the ventilation passageways may be a twisted tube that unwinds to permit enhanced airflow.

FIGS. 6A and 6B illustrate two exemplary embodiments of the distal end 30 of an unsealed isolation passageway 27, in the collapsed position, when the air mover 28 is turned off. The distal end 30 of the isolation passageway shown in FIG. 6A defines a generally circular opening and the distal end 30 in FIG. 6B defines a generally elliptical opening. However, the distal ends 30 may be defined by a myriad of shapes suitable for restricting airflow through the isolation passageway. These circular or elliptical openings at the distal end 30 generally define an unsealed passage between each distal end and the housing 24.

The widths depicted in FIGS. 6A and 6B, even though each width may be different from the other, are both generally designated as $w_1$ to indicate the isolation passageways are sized for restricting airflow to the oxygen electrodes. Conversely, the expanded isolation passageway 27 illustrated in FIG. 7 has a width $w_2$ indicating that the width of the depicted passageway is sized for permitting airflow generated by the air mover 28 to flow easily to the oxygen electrodes.

Each of the isolation passageways may be defined to include the thickness of the housing. The ventilation passageways could be cylindrical tubes having an isolation passageway of a length $L_2$ of about 0.3 to 2.5 inches or longer, with about 0.88 to 1.0 inches preferred as explained above. In the partially collapsed position, the isolation passageways 27 could have a width $w_1$ of about 0.03 to 0.3 inches, with about 0.09 to 0.19 inches preferred.

FIG. 7 illustrates the distal end shown in either FIG. 6A or 6B when the isolation passageway 27 is expanded in response to the air mover 28 being turned on. The distal ends of the isolation passageways are capable of being distorted in response to the air mover generating ambient airflow through the isolation passageways. Air movers 28 useful in the practice of the present invention include circulating fans, blowers, air pumps, bellows or some other suitable manner of generating sufficient ambient airflow and pressure such that the distal end 30 of the isolation passageways are expanded into the expanded position and the oxygen electrodes are exposed to a uniform distribution of oxygen.

More specifically, when the air mover 28 is turned off and the isolation passageways 27 are collapsed, the isolation passageways 27 are exposed to an ambient condition of pressure. However, when the air mover is turned on, the operation of the air mover exposes the isolation passageways 27 to a second condition of internal pressure in response to the airflow generated by the air mover. The second condition of pressure is greater than the ambient condition of pressure and causes the distal ends 30 of the isolation passageways to open up to a point larger than when the isolation passageway is restricting airflow while in the collapsed position.

The preferred capacity of the ventilation passageways for passing airflow in response to operation of the air mover depends upon the desired capacity of the metal-air cells. Any number of ventilation passageways can be used such that the aggregate airflow capacity of multiple ventilation passageways equals a preferred total airflow capacity. Those skilled in the art will appreciate that the length of the isolation portion of the ventilation passageways may be increased, and/or the diameter decreased, if the differential pressure created by the air mover is increased. A balance between the differential pressure created by the air mover and the dimensions of the isolation passageway portions can be found at which airflow and diffusion through the isolation passageways will be sufficiently reduced when the air mover is not forcing air through the isolation passageway. A goal of the present invention is to increase airflow during operation of the air mover 28 without increasing the differential pressure, by selectively enlarging the flow path.

In an exemplary embodiment, wherein the air mover 28 has a capacity of approximately 100 to 3000 cubic inches per minute, the inlet ventilation passageways 27a should be sized to permit a flow rate through the housing 24 when the air mover 28 is turned on of approximately 20 to 80 cubic inches per minute, to enable an output current density of approximately 10 to 500 ma per square inch or more of oxygen electrode surface. Preferably, a sufficient quantity of ambient air should reach the oxygen electrodes such that the metal-air battery cell delivers a current of at least 1.0 ampere when the air mover 28 is turned on. However, when the air mover 28 is turned off, the inlet isolation passageway portions should be sized to permit a flow rate through the housing 24 of approximately 0.01 to 0.2 cubic inches per minute or less, preferably 0.01 cubic inches per minute or less, with drain current density of less than 1 ma per square cm of oxygen electrode surface.

FIGS. 8 and 9 illustrate alternative embodiments of metal-air cells 22 enclosed by the common battery cell housing 24. More specifically, the battery packs of FIGS. 8 and 9 illustrate isolation passageways 27 in the collapsed position with the expanded position shown in dashed lines. The distal ends of the isolation passageways 27 are sealed with sealant 62 as explained above. In FIG. 8, the ventilation passageways 26 are directly aligned with one another such that the airflow in and out of the housing 24 is in the same direction. However, the barrier 50 in FIG. 8 is substantially longer than the barrier 50 shown in FIG. 1 in order to direct more of the airflow over the oxygen electrodes of the metal-air cells 22. The barrier 50 shown in FIG. 9 extends from one side of the housing 24 to approximately the midsection of the housing in order to uniformly provide oxygen to the electrodes.

One of the ventilation passageways 26 in each of FIGS. 8 and 9 is an inlet ventilation passageway 26a that inwardly extends from the air inlet opening 42a into the housing 24 and communicates with the interior of the housing 24. Also, as shown in FIGS. 8 and 9, the other ventilation passageway is an outlet ventilation passageway 26b that outwardly extends from the air outlet opening 42b of the housing 24. The outlet ventilation passageway 26b communicates with the environment exterior to the housing. The air mover 28 moves air into the housing 28 through the inlet ventilation passageway 26a and moves air out of the housing 24 through the outlet ventilation passageway 26b. However, the air mover 28 in FIG. 8 is an external air mover and the air mover in FIG. 9 is an internal air mover. Also, in FIG. 9, the ventilation passageways 26a, 26b are at a right angle to one another and the outlet ventilation passageway 26b is recessed in the housing 24. The recessed outlet ventilation passageway 26b is at least partially concealed from the user and is protected by the housing 24.

FIG. 10 illustrates an exemplary embodiment of the ventilation system 20 in a single cylindrical metal-air battery cell 22 and an external air mover 28. The metal-air battery cell 22 has inlet and outlet ventilation passageways 26a and 26b inlet and outlet openings 4ba 4b respectively and that are also in direct alignment. These ventilation passageways 26a and 26b have inlet and outlet isolation passageways 27a and 27b, respectively. A distinctive feature of the ventilation system 20 shown in FIG. 10 is that the exterior surface of the single metal-air battery 22 is a housing 64 which, but for the isolation passageways 27, isolates the oxygen electrodes from the ambient air. The air mover 28 could alternatively be positioned within the housing 64. Within the metal-air cell 22 shown in FIG. 10 is a permeable oxygen electrode 66 and a metallic anode 68 separated by an aqueous electrolyte (not shown).

FIGS. 11–13 illustrate an alternative embodiment of the present invention. A ventilation system 20 having a ventilation passageway 70 is distinguishable from the ventilation passageways 26 described above in that the ventilation passageways 70 are normally biased to remain in a longitudinally extended position in order to restrict airflow, acting as an isolation passageway. The passageway 70 as shown in FIGS. 11–13 is a telescopic tube having a plurality of interlocking tubes 72. Each of the tubes 72 has a flanged portion 74 on one end for slidably supporting an adjacent tube 72. When the tubes 72 are in the extended position, the flanged portions 74 of adjacent tubes act as stops by abutting one another. The diameters of the tubes 72 preferably vary only slightly, although the difference is exaggerated in the drawings. FIGS. 14 and 15 illustrate a second alternative embodiment. A ventilation passageway 80 is also normally biased to remain in a longitudinally extended position in order to restrict airflow. As shown in FIGS. 14 and 15, the ventilation passageway 80 has a longitudinally stretchable or retractable portion 82. Preferably, the retractable portion 82 is crenellated as shown in FIG. 14 and 15. When stretched out, the passageway 80 acts as an isolating passageway.

The length of the passageways 70, 80 when in the longitudinally extended position shown in FIGS. 11, 13 and 14 is greater than the length of the ventilation passageways 70, 80 when in a longitudinally retracted position shown in FIGS. 12 and 15. The longer length of the ventilation passageways 70, 80 while in the longitudinally extended position increases the isolation ratio of the ventilation system such that the oxygen electrodes are more effectively isolated from the ambient atmosphere than when the ventilation passageways 70, 80 are in the retracted position even though retracting the length does not substantially change the cross-sectional area. The ventilation passageways 70, 80 remain unsealed in the longitudinally extended and retracted positions.

Alternatively, shape memory alloy wires may be used as actuators to configure passageways into the desired position. By "shape memory alloy wires" we mean a wire that is made to "remember" a particular shape. For example, the composition may be nitinol alloys with nearly equal atomic weights of nickel and titanium. Such a SMA wire is formed at low temperatures to the desired shape, clamped, and then heated past its transformation temperature to its annealed temperature. When cooled, the SMA wire can be easily deformed. Thereafter, the wire will return to its annealed shape when heated. After the heat source is removed and the wire has cooled below a known temperature, the wire can be physically forced back to its deformed shape and the cycle can be repeated. A SMA wire can thus provide mechanical movement without the use of a traditional motor, solenoid, etc. A preferred shape memory allow wire is sold by Dynalloy, Inc. of Erin, Calif. under the trademark "Flexinol" actuator wires.

FIGS. 16–19 illustrate two alternative embodiments of the present invention using SMA wires to expand and collapse the isolation passageways. FIGS. 16 and 17 illustrate an elongated tubular isolation passageway 90 having a linear SMA wire 92. The SMA wire 92 is coupled along the diameter of the isolation passageway 90. FIG. 16 illustrates the isolation passageway 90 in the collapsed position for restricting airflow. The ends of the SMA wire are connected to the cell 22 by leads (not shown). A control circuit (not shown) selectively directs current from the cells 22 to the SMA wire. When the SMA wire 92 is heated by current from the cells 22, the length of the SMA wire is increased and the width of the passageway 92 around the SMA wire is increased, thereby increasing the capacity of the passageway 90. FIG. 17 illustrates the passageway 90 in the expanded position. The elasticity of the passageway 90 returns the passageway 90 to its original shape and isolation functions when the SMA wire 92 cools.

The alternative embodiment of an isolation passageway 100 shown in FIGS. 18 and 19 uses one or more SMA rings 102 spaced along the elongated tubular isolation passageway 100. The SMA rings 102 are aligned in series with one another and the periphery of each SMA 102 is coupled to or embedded in the wall of the isolation passageway 100. The centers of the SMA rings 102 are coaxial with the center of the isolation passageway 100. Current from the cells 22 may be applied to all of the SMA rings 102 simultaneously by leads (not shown) for a short period of time so that the isolation passageway 100 is expanded to permit enhanced airflow generated by an air mover through the passageway 90. Contraction back to an isolation condition is caused after the rings cool by the elasticity of the isolation passageway 100.

Alternatively, the current may be controlled so that each SMA ring 102 of a plurality of rings may sequentially expand and contract along the length of the isolation passageway 100 to cause air to be moved through the passageway 100 without the aide of a separate air mover. The wave effect created by such a sequential expansion and contraction of the shape-change elements 102 along the length of the passageway 100 resembles the peristaltic effect created by the muscular contraction and relaxation of intestines.

The use of the ventilation system 20 as described above constitutes an inventive method of the present invention in addition to the ventilation system 20 itself. In practicing the method of controlling airflow in the metal-air battery cell 22, the steps include confining at least one metal-air battery cell within a housing 24 as described above. The method then includes the step of operating the air mover 28 to generate airflow through the housing 24. In response to operating the air mover, the method also includes the step of expanding collapsible isolation passageways 27, of the type described above. In response to the passageways being expanded, the air mover provides air to the oxygen electrodes so that the metal-air battery generates an output current. The airflow capacity of the passageway is enhanced at the same differential pressure across the passageway.

The invention also includes the step of precluding operation of the air mover such that the air mover does not generate airflow through the housing. In response to precluding operation of the air mover 28, the method of the present invention then includes the step of collapsing the ventilation passageways 26 into at least a partially collapsed position at portions 27 to restrict airflow through the housing 24 as described above. In response to the isolation portions 27 passageways being in at least the partially collapsed position, the air mover ceases to provide airflow to the oxygen electrode so that the metal-air battery generates a drain current.

The method of the present invention may further include the step of maintaining the isolation passageways 27 in an unsealed state after partially collapsing the passageways as described above. Also, the method may then include the step of re-expanding the isolation passageways by recommencing operation of the air mover 28. The action of the ventilation passageways changing back and forth between the partially collapsed and expanded positions may otherwise be referred to as toggling.

Alternatively, the method of the present invention may include the use of either of the ventilation passageways 70 and 80 as described above. In response to the air mover 28 being turned on, the method of controlling airflow in the metal-air battery 22 includes the step of longitudinally retracting passageways 70, 80 such that airflow through the passageways 70, 80 and into the housing is enhanced. In response to precluding operation of the air mover 28, the alternative method then includes the step of longitudinally extending the passageways 70, 80 to restrict airflow through the housing as described above.

The use of the passageways 90, 100 as described above also constitutes an inventive method of the present invention. Practicing the present invention utilizing either of the passageways 90, 100 includes the steps of passing a current through a shape memory wire as described above. The method then includes the step of expanding the shape memory wire as described above in response to passing the current therethrough. Next, in response to expanding the shape memory wire, the method includes the step of expanding the isolation passageway to permit enhanced airflow as described above.

Although the one or more metal-air cells, the one or more isolation passageways and the air mover are disclosed as being together as a unit, those skilled in the art will appreciate that the cells may be replaceable. In such a configuration, the combination of the air mover and the one or more isolation passageways can be characterized as a ventilation system for removably receiving the one or more metal-air cells. Similarly, the one or more metal-air cells and the one or more isolation passageways may be provided together as an electrochemical storage unit that is separate from the air mover. The electrochemical storage unit may then be selectively associated with an air mover that is operated to provide airflow to the one or more oxygen electrodes of the electrochemical storage unit.

The present invention has been illustrated in great detail by the above specific examples. It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

What is claimed is:

1. A ventilation system for a metal-air battery comprising:
   a housing for enclosing at least one metal-air cell;
   a ventilation passageway having a collapsible resilient portion, said ventilation passageway at least partially defining a communication path between the exterior and interior of said housing, said resilient portion biased to normally remain in a collapsed position to restrict airflow therethrough, said passageway remaining unsealed when said resilient portion is in said collapsed position, and said resilient portion being expandable into an expanded position; and
   means for expanding said resilient portion into said expanded position such that enhanced airflow is permitted through said ventilation passageway when said resilient portion is in said expanded position.

2. The ventilation system of claim 1 wherein said means for expanding said resilient portion comprises one or more shape memory alloy rings aligned in a coaxial manner with respect to said ventilation passageway, said shape memory alloy rings sequentially expanding and contracting in said resilient portion to cause airflow through said ventilation passageway.

3. The ventilation system of claim 1 wherein said means for expanding said resilient portion comprises one or more shape memory alloy rings aligned in a coaxial manner with respect to said ventilation passageway, said shape memory alloy rings expanding to permit enhanced airflow generated by an air mover through said ventilation passageway and contracting to restrict airflow through said ventilation passageway.

4. The ventilation system of claim 3 further comprising an air mover positioned to create a flow of air through said ventilation passageway.

5. The system of claim 1 wherein said means for expanding said resilient portion comprises an air mover cooperating with said ventilation passageway to generate airflow within said housing.

6. A ventilation system for a metal-air battery comprising:
   a housing for enclosing at least one metal-air cell; and
   at least one collapsible passageway at least partially defining a communication path between the interior and exterior of said housing, said passageway biased to normally remain in a collapsed position to restrict airflow therethrough, said passageway being expandable into an expanded position in response to airflow through said housing.

7. The ventilation system of claim 6 wherein in said collapsed position said passageway is essentially blocked.

8. The ventilation system of claim 6 wherein in said collapsed position said passageway forms an unsealed isolation passageway.

9. The ventilation system of claim 6 wherein said passageway while in said collapsed position has a first cross-sectional area operative with a length in the direction of airflow therethough to restrict airflow into said housing and said passageway while in said expanded position has a second cross-sectional area operative to permit airflow into said housing, said first and second cross-sectional areas being determined at the narrowest point along said length of said passageway, and said first cross-sectional area being smaller than said second cross-sectional area.

10. The ventilation system of claim 6 wherein each said passageway while in said collapsed position has a first width perpendicular to the direction of airflow therethrough that is lesser than a length of said passageway in the direction of airflow therethrough, and said while in said expanded position has a second width perpendicular to the direction of airflow therethrough that is greater than said first width of said passageway while in said collapsed position, and said first and second widths being determined at the narrowest point along said length of said passageway.

11. The ventilation system of claim 6 wherein said housing includes an air inlet opening communicating with the air in the interior of said housing and an air outlet opening communicating with the air exterior of said housing, one of said passageways coupled to said air inlet opening and being an inlet passageway and another of said passageways coupled to said outlet opening and being an outlet passageway.

12. The ventilation system of claim 11 wherein said passageways are isolation passageways having proximal and distal ends, said proximal ends coupled to said housing at said inlet and outlet openings, said distal ends each being configured to define a first cross-sectional area while being exposed to an ambient condition of pressure in said collapsed position, said distal ends capable of being distorted and opening up into a second cross-sectional area when said passageways are expanded into said expanded position, said second cross-sectional area being larger than said first cross-sectional area, and said distal ends being distorted and opening up while being exposed to a second condition of pressure in response to said airflow, and said first and second cross-sectional areas generally defining an unsealed passage between each said distal end and said housing.

13. The ventilation system of claim 11 wherein said passageways each have proximal and distal ends, a length between said proximal and distal ends, and a cross-sectional area at said distal ends when in said collapsed position, said proximal ends coupled to said housing at said inlet and outlet openings, and each said isolation passageway having a ratio of its length squared to its cross-sectional area of approximately 100 to 1 or greater while in said collapsed position.

14. The ventilation system of claim 11 wherein said passageways have proximal and distal ends, a length between said proximal and distal ends, and a width at said distal ends while in said collapsed position, said proximal ends coupled to said housing at said air openings, and each said length being greater than said width when said passageways are in said collapsed position.

15. The ventilation system of claim 6 wherein said passageways have proximal and distal ends, said proximal ends coupled to said housing at said inlet and outlet openings, said distal ends each being configured to define a collapsed opening while being exposed to an ambient condition of pressure while said passageway is in said collapsed position, said distal ends capable of being distorted and opening up into expanded openings when said passageways are expanded into said expanded position, said distal ends being distorted and opening up while being exposed to a second condition of pressure in response to said airflow, and said collapsed and expanded openings generally defining an unsealed passage between each said distal end and said housing.

16. The ventilation system of claim 6 wherein said passageways have proximal and distal ends, said proximal ends coupled to said housing at inlet and outlet openings, said distal ends each being configured to define a flattened opening while being exposed to an ambient condition of pressure while in said collapsed position, said distal ends capable of being distorted and opening up into rounded openings when said passageways are expanded into said expanded position, said distal ends being distorted and opening up while being exposed to a second condition of pressure in response to said airflow, and said flattened and rounded openings each defining an unsealed passage between each said distal end and said housing.

17. The ventilation system of claim 6 wherein said passageways in said collapsed position each have a collapsed length from approximately 0.3 to 2.5 inches and a collapsed width from approximately 0.03 to 0.3 inches.

18. The ventilation system of claim 6 further comprising an air mover positioned to force air through said passageway when said air mover is turned on, said passageway expanding into said expanded position when said air mover is turned on and returning to said collapsed position to substantially restrict airflow through said housing when said air mover is turned off.

19. The ventilation system of claim 18 wherein said housing includes an air inlet opening and an air outlet opening, one of said passageways is an outlet isolation passageway that outwardly extends from said air outlet opening of said housing and communicates with the environment exterior to said housing, another of said passageways is an inlet isolation passageway that inwardly extends from said air inlet opening into said housing and communicates with the interior of said housing, and said air mover moves air into said housing through said inlet isolation passageway and moves air out of said housing through said outlet isolation passageway.

20. The ventilation system of claim 18 wherein said isolation passageways each have proximal and distal ends, said distal ends having openings sized in the aggregate to permit a flow rate through said housing with said air mover turned on of approximately 20 or more cubic inches per minute.

21. The ventilation system of claim 18 wherein said isolation passageways each have proximal and distal ends, said distal ends having openings sized in the aggregate to permit a flow rate through said housing with said air mover turned off of approximately 0.2 cubic inches per minute or less.

22. The ventilation system of claim 18 wherein the metal-air battery has a drain current density with said air mover turned off is less than 1 ma per square cm of oxygen electrode surface.

23. The ventilation system of claim 18 wherein said air mover has a capacity of approximately 100 to 3000 cubic inches per minute.

24. The ventilation system of claim 18 wherein the output current density of the metal-air battery with said air mover turned on is about 10 ma per square inch of oxygen electrode surface or more.

25. The ventilation system of claim 18 wherein the metal-air battery delivers a current of at least 1.0 amperes when said air mover is turned on.

26. The ventilation system of claim 6 wherein at least a portion of the inside of said passageway is coated with a sealant.

27. A ventilation system for providing reactant air to a metal-air battery comprising:

a housing for enclosing a plurality of metal-air cells and defining openings through said housing;

an air mover cooperating with said openings and generating airflow within said housing; and a plurality of collapsible resilient isolation passageways coupled to said housing at said openings, each said isolation passageway expandable into an expanded position in response to said air mover generating airflow through said housing, said isolation passageways biased to normally remain in a collapsed position to restrict airflow through said housing, and each said isolation passageway having a length in the direction of airflow therethrough while in said collapsed position that is greater than a width perpendicular to the direction of airflow therethrough while in said collapsed position.

28. The ventilation system of claim 27 wherein said isolation passageways each have proximal and distal ends, said length being between said proximal and distal ends, and a cross-sectional area at each said distal end when each said isolation passageway is in said collapsed position, said proximal ends coupled to said housing at said openings, and each said isolation passageway having a ratio of its length squared to its cross-sectional area of approximately 100 to 1 or greater while in said collapsed position.

29. The ventilation system of claim 27 wherein said isolation passageways each have proximal and distal ends, said length being between said proximal and distal ends, and a width at each said distal end while each said isolation passageway is in said collapsed position, said proximal ends coupled to said housing at said openings, and each said length being greater than said width when said isolation passageways are in said collapsed position.

30. The ventilation system of claim 27 wherein said isolation passageways each have proximal and distal ends, said distal ends having openings sized in the aggregate to permit a flow rate through said housing with said air mover turned on and said isolation passageways in said expanded position of approximately 20 to 80 cubic inches per minute.

31. The ventilation system of claim 27 wherein said isolation passageways each have proximal and distal ends, said distal ends having openings sized in the aggregate to permit a flow rate through said housing with said air mover turned off and said isolation passageways in said collapsed position of approximately 0.2 cubic inches per minute or less.

32. A method for controlling airflow in a metal-air battery, said method comprising the steps of:

confining at least one metal-air cell within a housing;

operating an air mover to generate airflow through said housing;

in response to operating said air mover, expanding a collapsible isolation passageway coupled to an openings in said housing;

precluding operation of said air mover such that said air mover does not generate airflow through said housing; and in response to precluding operation of said air mover, at least partially collapsing said isolation passageway to restrict airflow through said housing.

33. The method of claim 32 further comprising the step of maintaining said isolation passageway in an unsealed state after collapsing said isolation passageway.

34. The method of claim 32 further comprising the step of re-expanding said isolation passageway by recommencing operation of said air mover.

35. The method of claim 32 wherein said isolation passageway expands to define a width perpendicular to the direction of airflow passing through said isolation passageway as a result of said air mover being turned on that is greater than a width perpendicular to the direction of airflow through said isolation passageway when airflow is restricted through said housing as a result of said air mover being turned off.

36. The method of claim 32 wherein said step of operating said air mover comprises generating a flow rate of approximately 20 or more cubic inches per minute through said expanded isolation passageway.

37. The method of claim 32 wherein said step of precluding operation of said air mover comprises restricting airflow through said isolation passageway to approximately 0.2 cubic inches per minute or less.

38. A method for controlling reactant airflow to a metal-air battery having an oxygen electrode, said method comprising the steps of:

confining at least one metal-air cell within a housing;

operating an air mover to generate airflow through said housing;

toggling an isolation passageway that communicates between the exterior and interior of said housing between a collapsed position and an expanded position, said passageway expanding into said expanded position in response to operation of said air mover and said isolation passageway collapsing into said collapsed position in response to said air mover no longer operating;

in response to said isolation passageway being expanded into said expanded position, said air mover providing airflow to the oxygen electrode of the metal-air battery so that the metal-air battery generates an output current, and in response to said air mover no longer operating, said air mover ceasing to provide airflow to the oxygen electrode of the metal-air battery and therefore maintaining said isolation passageway in said collapsed position and in an unsealed state so that the metal-air battery generates a drain current, said drain current being substantially less than said output current.

39. A ventilation system for a metal-air battery comprising:

a housing for enclosing at least one metal-air cell;

an isolation passageway in a longitudinally extended position to form a first elongated restrictive flow path into said housing, said isolation passageway being longitudinally retractable into a retracted position having a second shorter flow path, said isolation passageway remaining unsealed in said extended and in said retracted positions.

40. The ventilation system of claim 39 further comprising an air mover positioned to force air through said second shorter flow path of said isolation passageway when said air mover is turned on.

41. The ventilation system of claim 39 wherein the length of said isolation passageway is greater that the width of said isolation passageway when said isolation passageway is in the extended position.

42. The ventilation system of claim 39 wherein said isolation passageway has a length squared to cross-sectional area ratio of about 100 to 1 or greater when said isolation passageway is in the extended position.

43. The ventilation system of claim 39 wherein said isolation passageway outwardly extends from said housing and communicates with the environment exterior to said housing when in said extended and retracted positions.

44. The ventilation system of claim 39 wherein said isolation passageway inwardly extends from said housing and communicates with the interior of said housing when in said extended and retracted positions.

45. The ventilation system of claim 39 wherein said isolation passageway is a telescopic isolation passageway.

46. The ventilation system of claim 45 wherein said telescopic isolation passageway comprises a plurality of interlocking tubes, said interlocking tubes each having a flanged portion for slidably supporting an adjacent one of said tubes, and each said flanged portion abuts one other said flanged portion when said telescopic isolation passageway is in said extended position.

47. The ventilation system of claim 39 wherein said isolation passageway includes a longitudinally stretchable portion.

48. The ventilation system of claim 47 wherein said longitudinally stretchable portion is crenellated.

49. A method for controlling airflow in a metal-air battery, said method comprising the steps of:

confining at least one metal-air cell within a housing;

operating an air mover to generate airflow to an oxygen electrode of said metal-air cell;

in response to operating said air mover, at least partially collapsing isolation passageways communicating with said housing such that airflow through said isolation passageway and into said housing is enhanced;

precluding operation of said air mover such that said air mover does not generate airflow through said isolation passageway or said housing; and in response to precluding operation of said air mover, longitudinally extending said isolation passageway to increase resistance to airflow therethrough.

50. A ventilation system for a metal-air battery comprising:

a housing for enclosing at least one metal-air cell, said housing having at least one air opening communicating with outside air;

a collapsible resilient isolation passageway coupled to said opening and biased to normally remain in a partially collapsed position to restrict airflow therethrough, said isolation passageway being expandable into an expanded position, and said isolation passageway remaining unsealed when in said partially collapsed position; and an actuator operatively associated with said isolation passageway to selectively expand said isolation passageway into said expanded position such that enhanced airflow is permitted through said isolation passageway when said passageway is in said expanded position.

51. The ventilation system of claim 50 wherein said actuator comprises a shape memory alloy wire coupled to expand said isolation passageway to permit enhanced airflow therethrough in response to current passing through said shape memory alloy wire.

52. The ventilation system of claim 51 wherein said isolation passageway is an elongated tube and said shape memory alloy wire is a linear shape memory alloy wire coupled to the interior of said elongated tube.

53. The ventilation system of claim 50 wherein said isolation passageway is an elongated tube and said actuator comprises a plurality of shape memory alloy rings coupled to said elongated tube in a coaxial manner, spaced along said tube, said rings expanding in diameter in response to current passing therethrough.

54. The ventilation system of claim 53 further comprising means for sequentially passing current through said spaced rings to create a peristaltic pumping action.

55. A method for controlling airflow in a metal-air battery, said method comprising the steps of:

confining at least one metal-air cell within a housing;

providing at least one isolation passageway in said housing for communicating with air outside of said housing;

passing a current through a shape memory alloy wire coupled to said isolation passageway;

in response to passing said current through said shape memory alloy wire, expanding said shape memory alloy wire; and in response to expanding said shape memory alloy wire, expanding said isolation passageway to permit enhanced airflow therethrough.

56. The method of claim 55 further comprising the steps of:

ceasing the passing of current through said shape memory alloy wire; and in response to cessation of current through said shape memory alloy wire, collapsing said isolation passageway; and in response to collapsing said isolation passageway, increasing the resistance of airflow through said isolation passageway.

* * * * *